United States Patent
Roberts et al.

(10) Patent No.: US 10,649,867 B2
(45) Date of Patent: May 12, 2020

(54) RAID ARRAY REBUILD ASSIST FROM EXTERNAL ARRAY COPY

(71) Applicant: Western Digital Technologies, Inc., San Jose, CA (US)

(72) Inventors: Adam Roberts, Moncure, NC (US); Sivakumar Munnangi, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 188 days.

(21) Appl. No.: 15/843,486

(22) Filed: Dec. 15, 2017

(65) Prior Publication Data

US 2019/0188099 A1 Jun. 20, 2019

(51) Int. Cl.
*G06F 11/20* (2006.01)
*G06F 11/10* (2006.01)

(52) U.S. Cl.
CPC ...... *G06F 11/2094* (2013.01); *G06F 11/1092* (2013.01); *G06F 2201/805* (2013.01); *G06F 2201/82* (2013.01)

(58) Field of Classification Search
CPC .............................. G06F 11/20; G06F 11/2094
USPC ........................................................ 714/6.24
See application file for complete search history.

(56) References Cited

U.S. PATENT DOCUMENTS

| | | | |
|---|---|---|---|
| 7,783,917 B2 * | 8/2010 | Sheppard ............ | G06F 11/1096 714/6.12 |
| 8,601,311 B2 * | 12/2013 | Horn ..................... | G06F 11/108 714/6.2 |
| 8,615,681 B2 | 12/2013 | Horn | |
| 9,122,405 B1 | 9/2015 | Ludwig et al. | |
| 10,198,313 B2 * | 2/2019 | Barndt .................. | G06F 11/073 |
| 2006/0179218 A1 * | 8/2006 | Burkey ............... | G06F 11/2069 711/114 |
| 2008/0201525 A1 * | 8/2008 | Chen ..................... | G06F 3/0607 711/114 |
| 2010/0251012 A1 | 9/2010 | Zwisler et al. | |
| 2011/0289261 A1 * | 11/2011 | Candelaria .............. | G06F 11/20 711/103 |
| 2012/0151253 A1 | 6/2012 | Horn | |

(Continued)

FOREIGN PATENT DOCUMENTS

EP     2180407 B1     4/2017

OTHER PUBLICATIONS

International Search Report and Written Opinion of Application No. PCT/US2018/052506, Filed Sep. 25, 2018 (15 pages).

*Primary Examiner* — Kamini B Patel
(74) *Attorney, Agent, or Firm* — Patent Law Works LLP

(57) ABSTRACT

When rebuilding a RAID (Redundant Array of Independent Disks) array in which a drive has failed, if another RAID array contains a mirror copy of the of the rebuilding RAID array content, this mirroring RAID array can be used to more rapidly rebuild the RAID array with the failed drive. Data requests to the rebuilding RAID array can be redirected to the mirroring RAID array; data can be transferred from the mirroring RAID array; or a combination of these can be used to finish rebuilding more quickly. When transferring data to the rebuilding array from the mirroring array, the transfer can be performed as a direct memory access (DMA) process independently of the RAID module of either array.

19 Claims, 12 Drawing Sheets

(56) References Cited

U.S. PATENT DOCUMENTS

| | | | | |
|---|---|---|---|---|
| 2013/0067275 A1* | 3/2013 | Watanabe | ........... | G06F 11/1092 |
| | | | | 714/6.24 |
| 2014/0215262 A1* | 7/2014 | Li | ....................... | G06F 11/0727 |
| | | | | 714/6.21 |
| 2014/0304469 A1* | 10/2014 | Wu | ......................... | G06F 3/065 |
| | | | | 711/114 |
| 2016/0371013 A1* | 12/2016 | Fluman | ................. | G06F 3/0611 |

* cited by examiner

RAID ARRAY REBUILD ASSIST FROM EXTERNAL ARRAY COPY

BACKGROUND

Semiconductor memory is widely used in various electronic devices such as cellular telephones, digital cameras, personal digital assistants, medical electronics, mobile computing devices, servers, solid-state drives, non-mobile computing devices and other devices. Semiconductor memory may comprise non-volatile memory or volatile memory. A non-volatile memory allows information to be stored and retained even when the non-volatile memory is not connected to a source of power (e.g., a battery).

As memory structures increase in density, it becomes more challenging to maintain the integrity of the data being stored. One way to maintain data integrity is through use of Error Correction Codes (ECC). However, error correction codes can only handle a limited amount of error and data retention can be further improved by increasing the effectiveness of ECC techniques. Other ways to maintain data integrity is through the use of RAID (Redundant Array of Independent Disks) techniques, where data is stored in a redundant manner across a number of devices, allowing for the data to be reconstructed in case one of the devices fails. However, reconstruction of the lost data can be very time consuming.

BRIEF DESCRIPTION OF THE DRAWINGS

Like-numbered elements refer to common components in the different figures.

DETAILED DESCRIPTION

Figure 1:
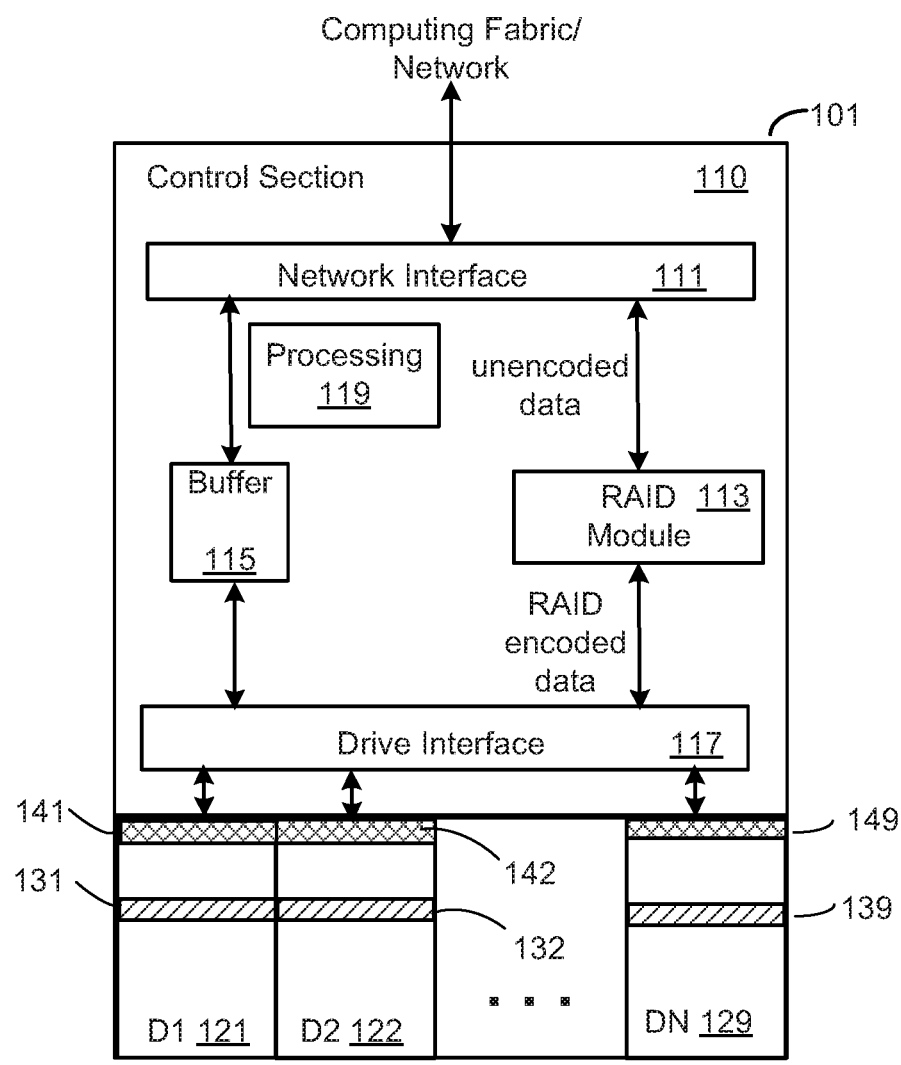
FIG. 1 is block diagram of one embodiment of a RAID array.

RAID (Redundant Array of Independent Disks) arrays provide an efficient method for protecting data and correcting devices failures without losing user data. In a RAID array, data is distributed across a number of different drives (such as solid-state drives, or SSDs, and hard disk drives, or HDDs), in a redundant manner to improve the reliability of the stored data. A number of RAID variations or "levels" (RAID levels 1, 2, 3, 4, 5, 6, 10, 50, 60, among others), including erasure codes, are used. These various RAID levels store data by having multiple copies of data stored on different drives of a RAID array, by striping data sets across multiple drives of a RAID array, generating parities for the data and storing the parities across one or more of the RAID array's drives, or various combinations of these. These redundancies allow for the protection of the data should one of the RAID array's drives fail, as the lost data can be rebuilt from other drives in the array or re-constructible from the parities.

As non-volatile data storage systems move forward into denser platforms, the failure domain of a RAID array has grown to the point of being problematic. As an example, a RAID array of five hard drives with a capacity of 1.2 tetra Bytes (TB) can take the RAID array approximately seven days to rebuild if the array is under load, having to supply user data to hosts, during the rebuild process. The same array can rebuild in less than 2 hours if the workload is removed from the device. This indicates that thrashing back and forth between rebuild activities and user activities (reading and writing of host data) lengthens the time for rebuild completion and can be positively impacted by removing some or all of the user workload during rebuild, but at the cost of making data stored on the system unavailable during the rebuild. Solid-state drives (SSDs) based RAID arrays can rebuild faster than a hard disk drive based RAID arrays, but as non-volatile data storage systems move towards 32 TB and larger SSDs, the array rebuild time becomes lengthy even for SSDs and such systems can benefit by techniques to reduce the rebuild times for both HDD and SSD arrays. The rebuild process can be shortened by speeding up the array's RAID module, but this approach can only be pushed so far and is not a feasible approach given the size to which RAID arrays are growing.

The following presents techniques that utilize mirrored RAID arrays to limit or remove conflicts between rebuild activities and the user workload in order to allow for faster rebuild times by utilizing global intelligence with respect to the existence of other array copies and utilizing them to speed up the rebuild. Users of RAID arrays will often apply RAID to one RAID system in an enclosure, but also have an additional copy of the data or enclosure in another rack and, in some cases, in another geographic location to protect the data from natural disasters, local power outages, or to provide best location based performance, among other reasons. These mirrored copies can be used to accelerate rebuild process on a RAID array in a critical or non-optimal state.

For example, if one of the drives of a first RAID array fails, rather than rebuild the lost data within the RAID array, the array can request a copy from a mirroring second RAID array. The copy of the needed data can them be transferred in a direct memory access (DMA) process from the second array to the first array. The availability of the second, mirroring array can, for example, be kept as part of the metadata of the first array. In the transfer, although the data may pass through the control sections of the first and second RAID arrays, it does not pass through the RAID module of either array, but rather the RAID encoded passes through the controller independently of the RAID modules. The rate at which the data can be transferred can depend upon factors including the network connection between the two RAID arrays and the buffering capabilities of the two RAID arrays.

Depending upon these factors, and the load on the array needing rebuilding, it may be faster for the RAID array suffering the failure to perform the rebuilt itself, perform the rebuilt completely through the transfer of the mirror copies of the data, or some combination of these. For example, it the RAID arrays are connected over a high-performance computing fabric and have good buffering capabilities, the rebuild may be implemented completely through a data transfer, such as a remote DMA (RDMA) process. Conversely, if the available transfer rate is low and the first RAID array needing rebuilding is not under load, it may be more efficient to perform the rebuild within the first RAID array using the RAID module of its controller. In many circumstances, a combination of these two may be preferred, where the ratio can vary dependent upon conditions.

The rebuild process can also be accelerated by shifting requests for data to the mirroring RAID array, thereby reducing the load on the rebuilding array. As user requests to read data from or write data to an array can affect the rebuild process, the availability of the second, mirror copy of the data can be used to redirect some or all of the data access requests. For example, if a user requests data stored on the first RAID array during the rebuild process, the first array can instead have the requested data supplied from the mirror copy of the data in the second RAID array and provide this copy to the host, rather than accessing the data from one of its own drives (or recreating the data by the RAID module if the data is from a failed drive). Based upon conditions, the type of access, or both, the user requests can be handled directly by the RAID array undergoing the rebuild, the mirroring RAID array, or some combination of these. For example, alternating stripes could be supplied from the two RAID arrays (e.g., even data stripes from the first RAID array, odd stripes from the second RAID array); or, to take another example, read requests are accommodates through transfers from the second, mirroring RAID array, while write requests are handled by the first RAID array.

FIG. 1 is block diagram of one embodiment of a RAID array in which the technology proposed herein can be implemented. A typical embodiment of a RAID array 101 includes multiple drives D1-DN 121-129 and a control section 110 in a common enclosure. The drives D1-DN 121-129 can include hard disk drives (HDDs), solid-state drives (SSDs), other non-volatile storage drives, or some combinations of these, depending on the embodiment. The control section 110 can be made up of one or multiple integrated circuits that oversee the storage and management of data on the drives D1-DN 121-129. Among the elements of the control section 110 in the enclosure is a network interface 111, through which the RAID array connects to a network, and a drive interface 117, through which the control section 110 communicates with the drives D1-DN 121-129. The control section 110 of the RAID array 101 also includes a RAID module 113 that takes data received over the network from a host and RAID encodes the received data, which is then stored in a distributed manner across drives D1-DN 121-129. When reading requested data out, the RAID encoded data is then decoded by the RAID module 113, with the requested data then being supplied out over the network.

The RAID encoded data is stored distributed across the drives D1-DN 121-129 in a redundant manner. This is represented schematically at 131-139, where, after encoding, a received set of host data is spread across multiple drives. A number of RAID versions, or "levels", can be used to RAID encode a data set, depending on the embodiment. For example, in some RAID levels the redundancy can be supplied by having the same data set stored more than once across the different drives, such that, for example, the content in section 132 of drive D2 122 is a copy of the content 131 of drive D1 121.

In other RAID levels, a data set may be striped across several drives. In a striping arrangement, rather than store a data set on a single drive, is split up into "stripes" that are then spread across the drives D1-DN 121-129. In this arrangement, the each of 131-139 is a "minor" stripe (the size of the stripe on a single drive), with the combined stripes of 131-139 of the full collection of drives D1-DN 121-129 forming a "major" stripe (the size of a minor stripe multiplied by the number of drives).

In still other RAID levels, the RAID module generates parities stored on the drives D1-DN 121-129 that allow lost data to be reproduced by the RAID module 113. Parities are redundant data bits created from a data set, such as by bit-wise XOR-ing the values of a data set. The parities allow for data error or lost data to be reconstituted from the correct or remaining data values of a set, where the greater the number of parity bits generated, the greater the amount of lost data that can be reconstituted. Common RAID levels or embodiments often combine these techniques, such as striping a data set across multiple drives of the array and storing parities for the stripped data in one or more arrays. For example, in a striping arrangement using parity, the parities for each minor stripe can be stored as part of the minor stripe; or all the parities could be stored in a single one of the drives.

In terms of RAID nomenclature, the different levels are commonly referred to by a number, with some variations sometimes referred to as erasure codes, where the techniques described here can be applied with any of these variations. To give some examples, RAID 0 stripes data across multiple drives, RAID 1 is the term usually used to describe data mirrors, RAID 5 covers parity based single failures, and combinations of these are variations such as RAID 50 and RAID 10. RAID 10 is essentially striping data (RAID 0) in two places, hence a combination of RAID 0 and RAID 1. RAID 50 is a combination of RAID 0, with each RAID 0 stripe being broken up into a RAID 5 stripe, so that it is a combination of striping plus parity to combine the benefits of both striping and parity.

RAID 6 is an erasure code type variation that can handle two drive failures. Erasure codes are often used for large scale data transfers where there is real risk of losing multiple pieces of data. As a result, erasure codes are built around the idea of having more than two drive or target failures. As an example, an erasure code system could be designed with 20 drives or data targets and have 4 of the 20 targets be redundant, or have 8 out of 20 data targets be redundant. As a result, erasure coded arrays are considered here to be one of the RAID variations. Erasure code type RAID embodiments allow for as many redundant pieces of data as needed or wanted.

In addition to user data received from a host, the drives D1-DN 121-129 can store metadata 141-149. The metadata of each of the drives can include metadata related to the drive itself as well as system level metadata for the RAID array. As discussed further below, in some embodiments the metadata can include information on copies the data on RAID array 101 that may be stored on other RAID arrays, where this information on the copies can be used in a rebuild process for the RAID array 101.

The control section 110 will also include various processing circuitry, represented collectively as processing block 119, to oversee operations on the RAID array 101. Embodiments for the control section 110 also typically include ROM and RAM memory. In FIG. 1, only a buffer memory 115 is explicitly shown, where this may be formed of DRAM memory, for example. The buffer memory 115 is used to buffer RAID encoded data in a direct memory access type of transformation between RAID arrays to assist in rebuilding operations. The control section 110 may be formed of a number of modules on one or multiple integrated circuits. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include software stored in a processor readable device (e.g., memory) to program the processing block 119 and other elements of the control section 110 to perform the functions described herein.

Figure 2:
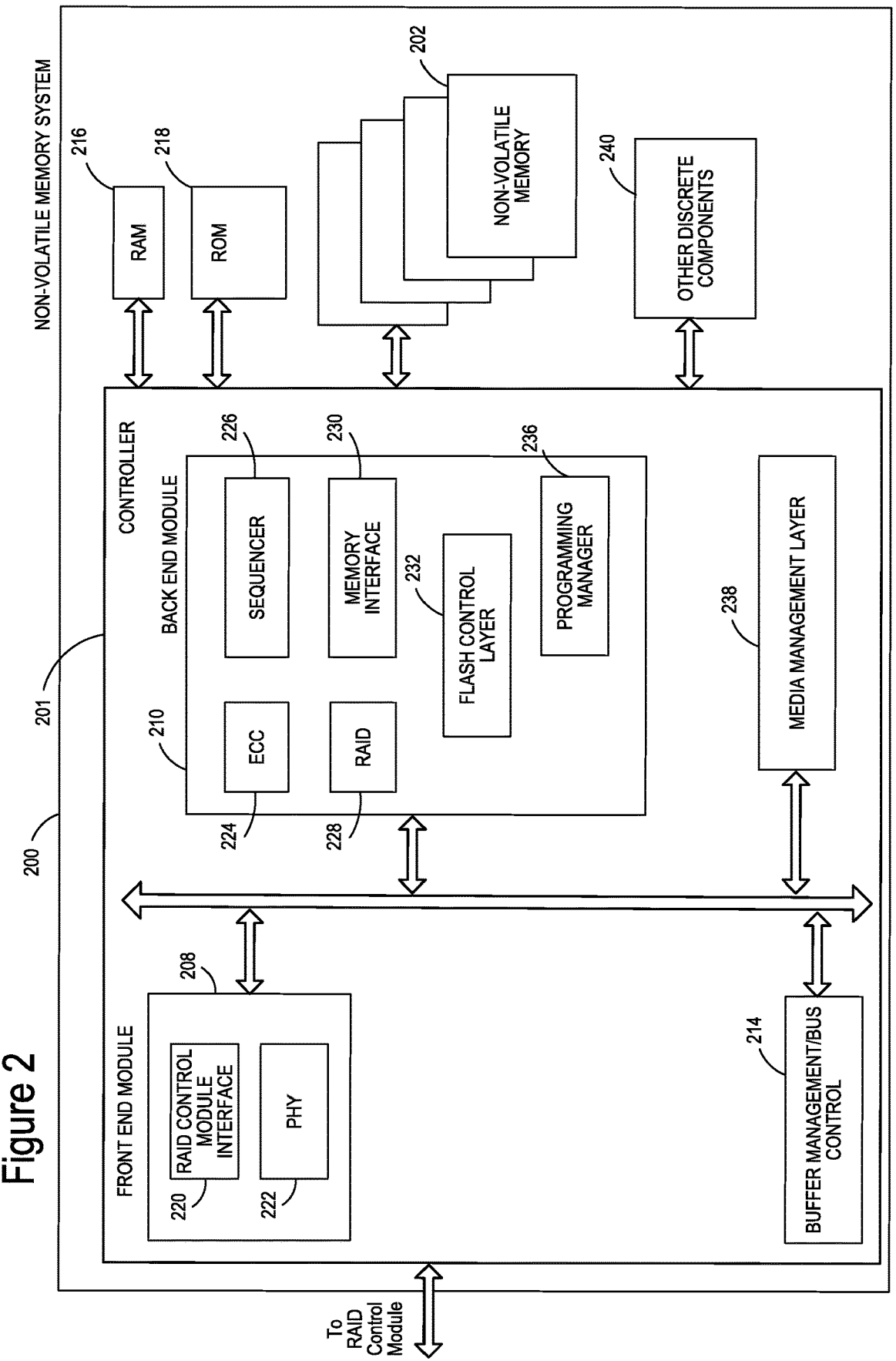
FIG. 2 is a block diagram of a solid-state drive (SSD) storage system, such as can be used for of the drives of the RAID array of FIG. 1.

FIG. 2 is a block diagram of an example a solid-state drive (SSD) memory system 200, such as can be used for each of the drives D1-DN 121-129 for RAID array embodiments using SSDs. The SSD 200 includes a controller 201 and several non-volatile memory devices 202, such a NAND flash memory chips. To some degree, the structure of SSD 200 mirrors the structure RAID array 101, with the SSD 200 having a controller 201 managing the data stored on a number of non-volatile memories 202, as the RAID array 101 has the control section 110 overseeing the drives D1-DN 121-129.

Considering the structure of FIG. 2 further, FIG. 2 is a block diagram of example memory system 200 such as can be used as an SSD and depicting some details of one embodiment of controller 201. As used herein, a flash memory controller is a device that manages data stored on flash memory and communicates with the RAID array control section 110 or, in other cases, a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when the RAID array control section 110 needs to read data from or write data to the SSD, it will communicate with the flash memory controller. If the RAID array control section provides a logical address to which data is to be read/written, the flash memory controller can convert the logical address received from the host RAID array control section to a physical address in the memory devices 202. Alternatively, the RAID array control section can provide the physical address. In some embodiments, the RAID array control section 110 will receive user data from a host that has a logical address, the RAID module will encode the data and assign a corresponding intermediate address, which is assigned a physical address by the controller 201 on the drive. The drive memory controller 201 can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between drive controller 201 and non-volatile memory die 202 may be any suitable flash interface, such as Toggle Mode 200, 400, or 800. In the embodiments discussed here, the memory system 200 is in the form of a solid-state drive (SSD) drive, but similar structures can also be used for non-SSD memory system applications, such as card based systems or embedded memory systems.

In some embodiments, the SSD drive 200 includes a single channel between controller 201 and non-volatile memory die 202, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2, controller 201 includes a front-end module 208 that interfaces with a RAID array control section, a back-end module 210 that interfaces with the one or more non-volatile memory dies 202, and various other modules that perform functions which will now be described in detail.

The non-volatile memory dies 202 can, for example, be NAND flash memory using charging-trapping materials in a three-dimensional memory structure that includes vertical NAND strings, or other (2D and 3D) memory structures. For example, floating gate memories (e.g., NAND-type and NOR-type flash memory), ReRAM memories, magnetoresistive memory (e.g., MRAM), and phase change memory (PCM, e.g. a chalcogenide glass based memory cell) can also be used.

One example of a ReRAM memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the behavior of chalcogenide glass, which has differing conduction levels based on whether the material is in a higher resistance amorphous state, or a lower resistance crystalline state. PCM memory embodiments can include three-dimensional vertical cross-point architectures, with the PCM memory cells operated in binary or multi-state embodiments.

The components of controller 201 depicted in FIG. 2 may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include software stored in a processor readable device (e.g., memory) to program a processor for controller 201 to perform the functions described herein. The architecture depicted in FIG. 2 is one example implementation that may (or may not) use the components of controller 201 depicted in FIG. 1A (i.e. RAM, ROM, processor, interface).

Referring again to modules of the drive controller 201, a buffer manager/bus control 214 manages buffers in random access memory (RAM) 216 and controls the internal bus arbitration of drive controller 201. A read only memory (ROM) 218 stores system boot code. Although illustrated in FIG. 2 as located separately from the drive controller 201, in other embodiments one or both of the RAM 216 and ROM 218 may be located within the controller. In yet other embodiments, portions of RAM and ROM may be located both within the drive controller 201 and outside the controller. Further, in some implementations, the drive controller 201, RAM 216, and ROM 218 may be located on separate semiconductor die.

Front end module 208 includes a RAID array control section interface 220 and a physical layer interface (PHY) 222 that provide the electrical interface with the RAID array control section or next level storage controller. The choice of the type of RAID array control section interface 220 can depend on the type of memory being used. Examples of interfaces 220 include, but are not limited to, SATA, SATA Express, SAS, Fibre Channel, USB, PCIe, and NVMe. The RAID array control section interface 220 typically facilitates transfer for data, control signals, and timing signals.

Back end module 210 includes an error correction Controller (ECC) engine 224 that encodes the data bytes received from the RAID array control section and decodes and error corrects the data bytes read from the non-volatile memory. The ECC engine 224 has one or more decoders. In one embodiment, the ECC engine 224 comprises a low-density parity check (LDPC) decoder. In one embodiment, the decoders of the ECC engine can include a hard decoder and a soft decoder. An output of the one or more decoders may be provided to the RAID array control section. The controller may be configured to receive hard bit values and soft bit values from the non-volatile memory 202. Hard bit values are derived from reading memory cells at hard bit read reference levels. Soft bit values are derived from reading memory cells at soft bit read reference levels. In one embodiment, hard bit values are input to a hard decoder. In one embodiment, hard bit values and soft bit values are input to a soft decoder.

Back end module 210 includes an error correction code (ECC) engine 224 that encodes the data bytes received from the RAID array control section, and decodes and error corrects the data bytes read from the non-volatile memory.

A command sequencer 226 generates command sequences, such as program and erase command sequences, to be transmitted to non-volatile memory die 202.

In some embodiments, the drive controller 201 can also include a RAID module 228 in addition to, or as an alternative to, the RAID module 113 on the RAID array control section 110. The inclusion of a RAID module on the drive can allow some or all of the RAID encoding and decoding to be offloaded onto the drives. As with the RAID module on the RAID array control section 110, in embodiments where the drive controller 201 also include a RAID module, the drive's RAID module 228 manages generation of RAID parity and recovery of failed data. The RAID parity may be used as an additional level of integrity protection for the data being written into the non-volatile memory system 200. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 202 and receives status information from non-volatile memory die 202. In one embodiment, memory interface 230 may be a double data rate (DDR) interface, such as a Toggle Mode 200, 400, or 800 interface. A flash control layer 232 controls the overall operation of back end module 210.

Additional components of system 200 illustrated in FIG. 2 can include media management layer 238, which performs wear leveling of memory cells of non-volatile memory die 202, and programming manager 236, which can be used to manage (in conjunction with the circuits on the memory die) the programming of memory cells. System 200 also includes other discrete components 240, such as external electrical interfaces, external RAM, resistors, capacitors, or other components that may interface with controller 201. In alternative embodiments, one or more of the physical layer interface 222, RAID module 228, media management layer 238, programming manager 236, and buffer management/bus controller 214 are optional components that are not necessary in the controller 201.

Controller 201 may interface with one or more memory dies 202 to implement a solid-state drive (SSD), which can emulate, replace or be used instead of a hard disk drive (HDD) inside the RAID array 101. Some embodiments of the SSD drive 200 will include one memory die 202 connected to one controller 201. However, other embodiments may include multiple memory dies 202 in communication with one or more controllers 201. In one example, the multiple memory die can be grouped into a set of memory packages. Each memory package includes one or more memory die in communication with controller 201. In one embodiment, a memory package includes a printed circuit board (or similar structure) with one or more memory die mounted thereon. In some embodiments, a memory package can include molding material to encase the memory dies of the memory package. In some embodiments, controller 201 is physically separate from any of the memory packages.

Figure 3:
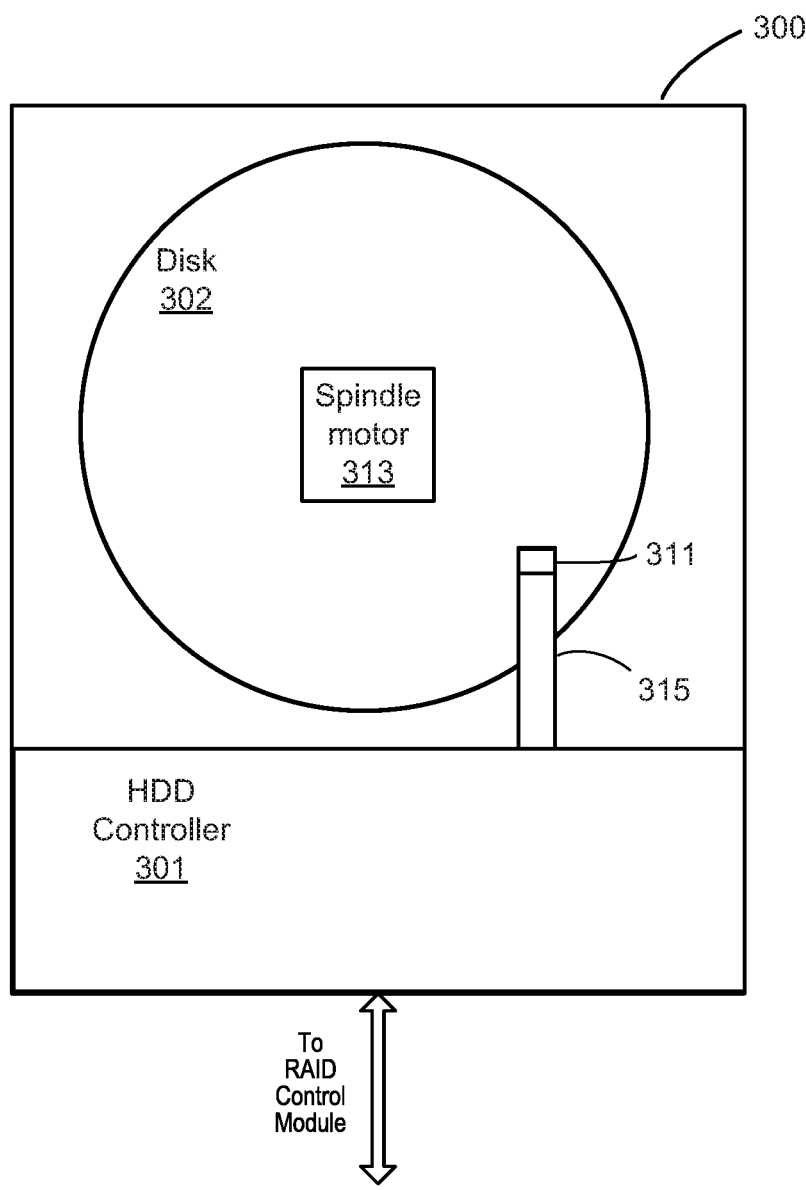
FIG. 3 is a block diagram of example a hard disk drive (HDD) storage system, such as can be used for of the drives of the RAID array of FIG. 1.

FIG. 3 is a block diagram of example a hard drive disk (HDD) 300, such as can be used for each of the drives D1-DN 121-129 for RAID array embodiments using hard drives. In the case of a hard drive, the storage media is one or more disks 302 that store data magnetically, rather than the solid-state non-volatile memory devices 202 of FIG. 2. In addition to the one or more disks, the hard disk drive 300 will again include a controller 301 that manages the storage of data on the disks 302. The controller of the hard drive system will perform many of the same functions and include elements corresponding to those of the SSD controller 201, but there will be difference due to the different physical nature of the storage media.

For the solid-state non-volatile memory devices 202, the reading, writing and erasing of the data is commonly executed by circuitry on the memory device itself. In the case of a hard drive disk, reading, writing and erasing operations on performed using a read/write head 311 that reads or changes the state of magnetization at a specified address. To change the position of the disks, to read or write to a selected disk address, a spindle motor 313 is connected to the disks. For example, the disk or disks of a drive are mounted on a spindle that the spindle motor 313 rotates, while the read/write head is mounted on an actuator arm 315 structure moved by an actuator (not shown), allowing the position of the read/write head to be moved radially. The controller 301 is configured to control the spindle motor 313 and the actuator to place the read/write head at the selected physical location on the disks 302.

Individually RAID arrays can be connected to other RAID arrays, hosts and other devices over a network. In some embodiments, this can be a computing "fabric" of interconnected nodes. A computing fabric is a consolidated high-performance computing system of nodes such as storage systems, hosts or other processing device, and other peripheral or other networking elements linked together over high bandwidth interconnects, resembling a fabric or weave formed out of these nodes.

Figure 4:
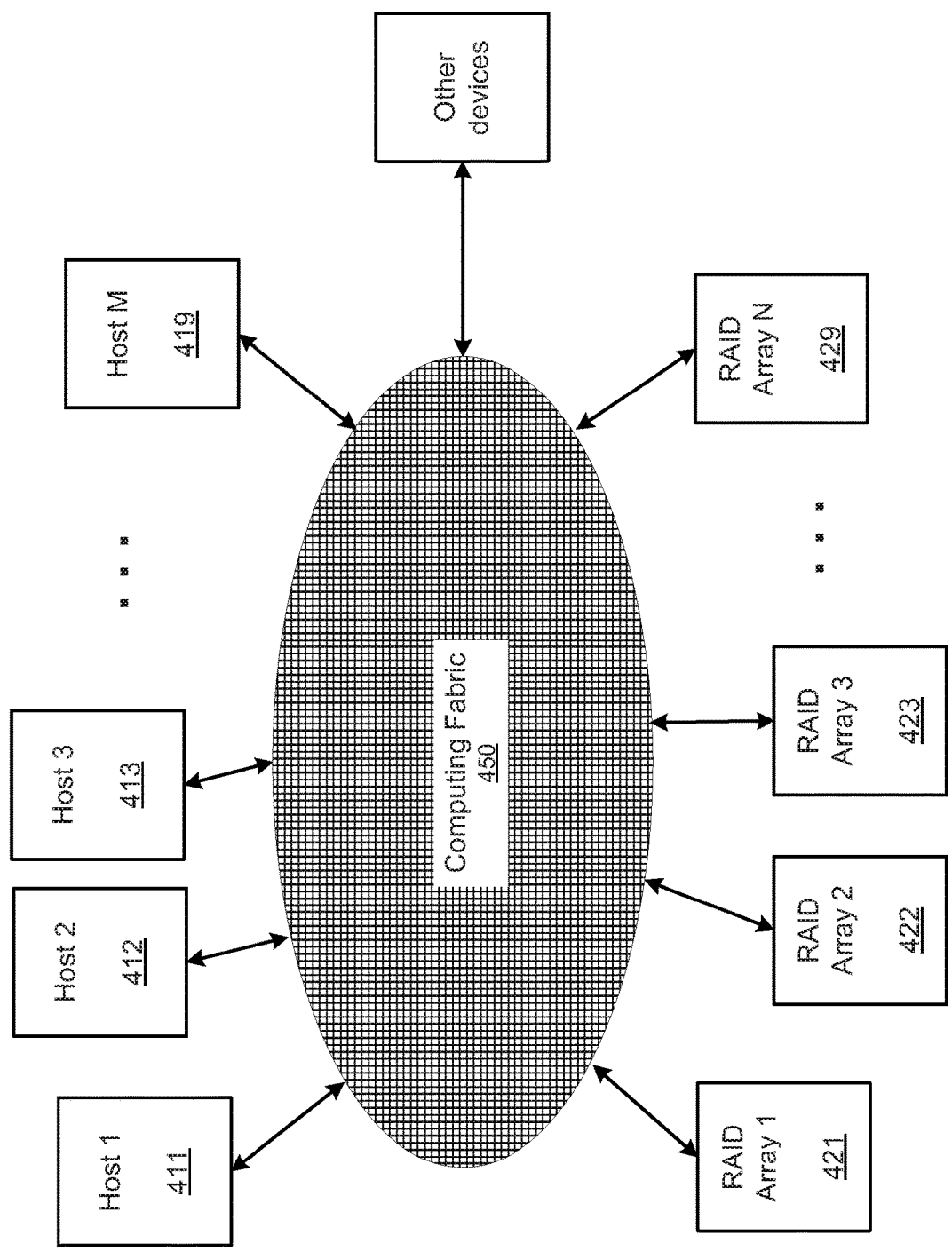
FIG. 4 is a schematic representation of a system in which RAID arrays and host devices and connected over a computing fabric.

FIG. 4 is a schematic representation of a system in which a computing fabric 450 that connects together RAID arrays 1-N 421-429, such as those described above with respect to FIGS. 1-3, and a number of host devices 1-M 411-419. The RAID arrays 421-429 and host devices can be near each other, such as in the same building or even on the same rack, or in a different location some distance away. For example, the different RAID arrays may be in another geographic location to protect the data from natural disasters, local power outages, or to provide best location based performance, among other reasons.

Referring back to FIG. 1, if one of the drives, say drive D1 121, of the RAID array 101 needs to be rebuilt, the RAID array controller section 110 can read out the corresponding RAID encoded redundant data from others of the drives D2-DN 122-129 and rebuild the content of the failing drive. Depending on the RAID embodiment (or level), this redundant data can include parities, copies of the data, or some combination of these, as described above. For example, as described above with respect to FIG. 1 the stripes 131-139 can correspond to a set of user data and its corresponding parities striped across the drives. For example, when the data from stripe 131 is lost (e.g., due to failure of drive D1 121), this can be reconstructed by the RAID module 113 from the other stripes. The RAID module 113 receives the RAID encoded data stored across the drives D2-DN 122-129, decodes the data, reconstructs the lost data, and then re-encodes the reconstructed data and rewrites it to one or more good drives. In some embodiments, the RAID array may maintain one or more spare drives to replace failed drives.

Figure 5:
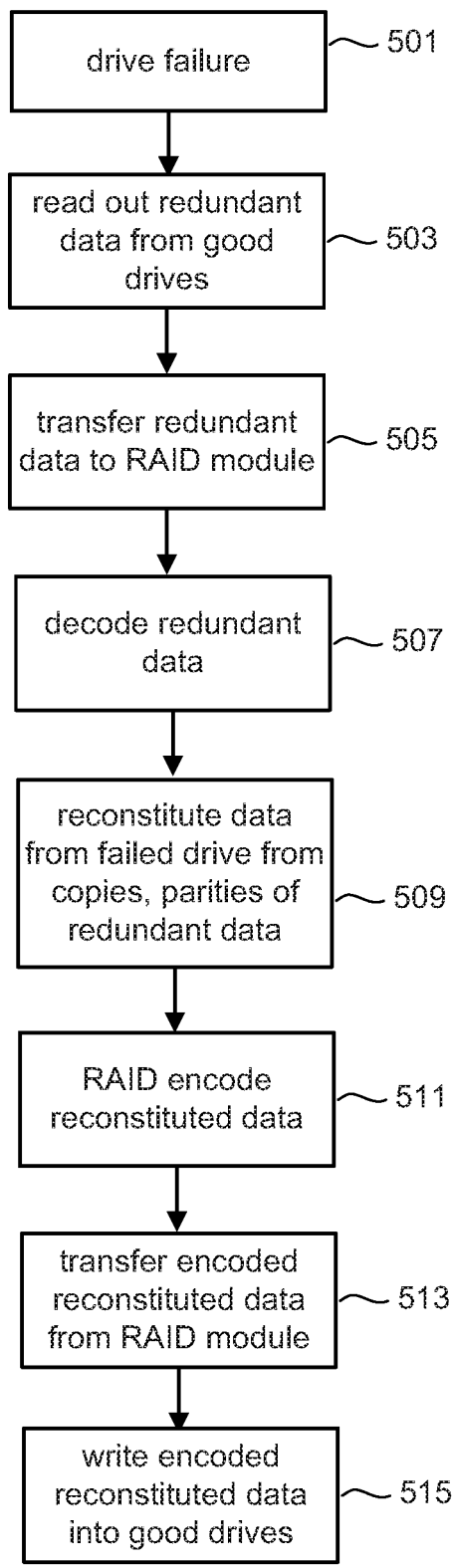
FIG. 5 is a flowchart describing one embodiment for an on-array rebuild of a RAID array.

FIG. 5 is a flowchart describing one embodiment of a process for a rebuild operation performed within a RAID array, such as that illustrated with respect to FIG. 1. At step 501, the RAID array 101 determines that one of its drives, drive D1 121 in this example, has failed or may be failing. This triggers the rebuild operation by reading out from the good drives D2-DN 122-129 of the redundant data for drive D1 121 at step 503, with the redundant data transferred over the drive interface 117 to the RAID module 113 at step 505.

At step 507, the RAID module decodes the redundant data and, at step 509, reconstitutes the data from the failed drive from the decoded redundant data. As discussed above with respect to FIG. 1, a number of RAID versions, or levels, can be used, based on the embodiment. This can include copies of the data, parities for the data, or combinations of these. For example, data of drive D1 121 may be mirror copied in data of drives D2-DN 122-129; or data of drive DN 139 may be parities corresponding to the data on the other drives, where the data on drive D1 121 can be reconstructed from the parity data on DN 129 and data on the other drives.

Once the data from the failed drive is reconstituted at 509, the RAID module 113 encodes the reconstituted data from the failed drive at step 511. At step 513 the encoded, reconstituted data is transferred back to the good drives over the drive interface, and then written into the good drives at step 515.

As discussed above, this rebuilding process can be very time consuming, particularly if the RAID array is to maintain service to users. When the RAID array is connected to another RAID array over a network, such as the computing fabric in FIG. 4, and the other RAID array has a mirror copy of the data on the failed drive, this can be used to accelerate the rebuild process.

Figure 6:
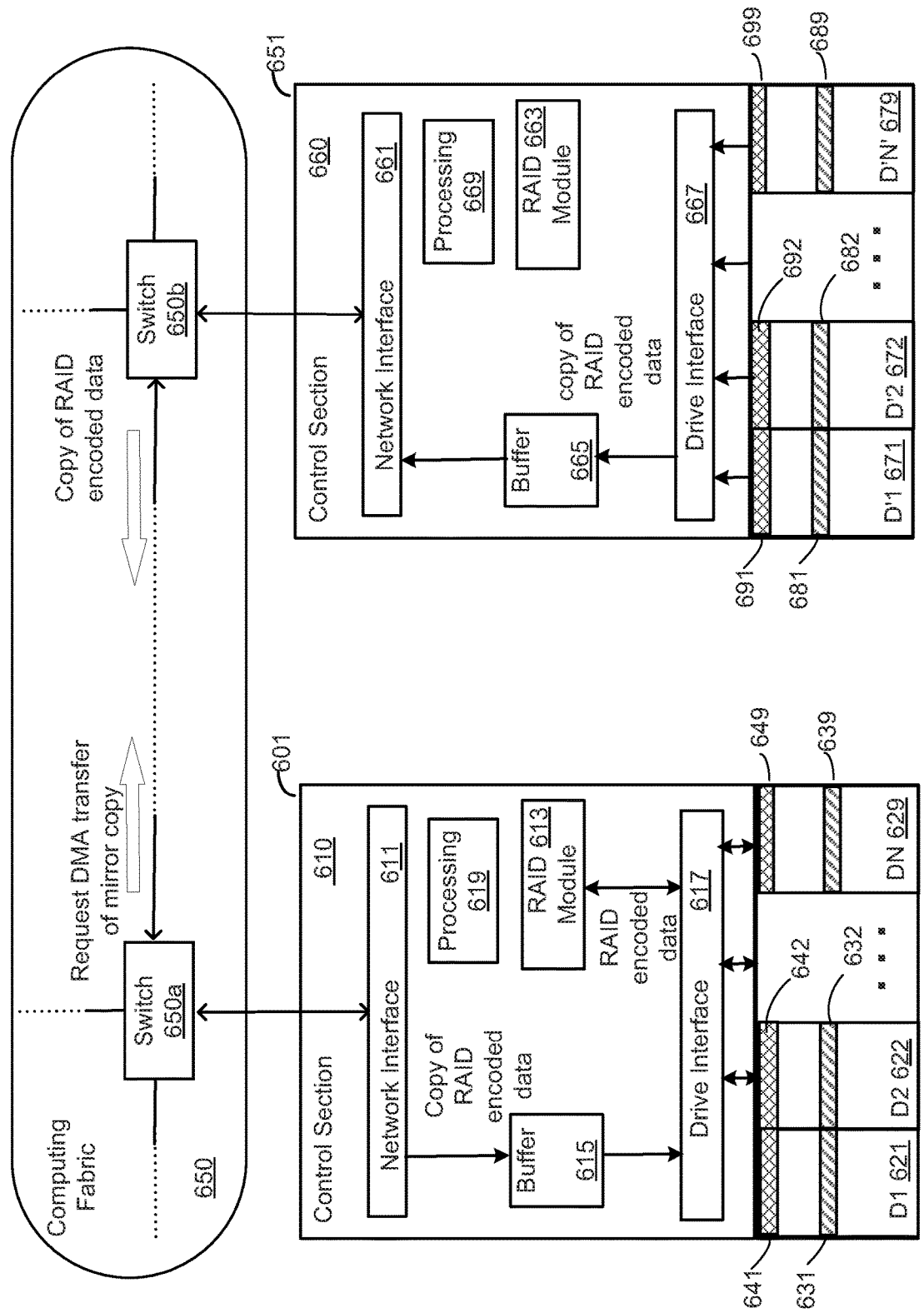
FIG. 6 is a simplified version of the fabric of FIG. 4 illustrating two RAID arrays connected over a computing fabric, but with more detail for the RAID arrays.

FIG. 6 is a simplified version of the fabric of FIG. 4, illustrating just two RAID arrays connected over the computing fabric, but with more detail for the RAID arrays, which are represented similarly to FIG. 1. As in FIG. 1, RAID array 601 includes drives D1-DN 621-629, with a respective portion 641-649 of each storing metadata. The explicitly represented elements of control section 610 include drive interface 617, network interface 611, processing module 619, RAID module 613, and a buffer 615. Similarly, RAID array 651 includes drives D'1-D'N' 671-679, a respective portion 691-699 of each storing metadata, and a control section 660 including drive interface 667, network interface 661, processing module 669, RAID module 663, and a buffer 665. RAID array 601 and RAID array 651 are connected over a computing fabric 650 or other network, which is represented as the connection of the two RAID arrays through the switches 650a and 650b.

In the example of FIG. 6, drive D1 621 of RAID array 601 has failed and its content needs to be rebuilt. RAID array 651 holds a mirror copy of the data in RAID array 601 in drive D'1 671 or distributed across the drives D'1-D'N' 671-679. The metadata on RAID array 601 can hold information that can tell the controller section 610 and/or the individual drives of the RAID array about the presence and location of other drive(s) that can assist with the rebuild or even provide a pre-emptive copy, if there is reason to expect a drive may fail. When the drive D1 621 is to be rebuilt, the drive or array is aware of the copy in D'1 671 through the metadata. Similarly, the drive D'1 671 or RAID array 651 can be aware of the copy of the data within D'1 671 that is stored in drive D1 621. This information can be stored in the metadata for both drives once the mirroring is complete, allowing either copy to be rebuilt from the other.

When the drive D1 621 needs rebuilding, the RAID array 601 and mirroring RAID array 651 can communicate to alleviate some or all of the rebuild by the RAID module 613. In some embodiments, this can be done at the level of the drives D1 621 and D'1 671. Through peer to peer communication, the drive D1 621 can request a copy of the data content in D1 621 from D'1 671 to assist rebuild by sending some or all of the data on the drive D'1 671 drive. In some embodiments, the drives can handle some or all of the rebuild amongst themselves, while the RAID module 613 handles basic data striping and the drives use peer to peer communication to handle parity and data exchange. In such embodiments, decisions to choose to involve a remote copy of the array to assist in the rebuild as well as complete the actual rebuild could be handled by the drives themselves as well as the RAID module 613.

In some embodiments, RAID array 601 sends the request for a direct memory access (DMA) transfer of some or all of the copy of data on D1 621. In a DMA transfer, during the transfer out of the drives on the sending RAID array 651 and into the drives of the receiving RAID array 601, the data is just passed through the respective control sections 610 and 660, without the RAID modules 613, 663 or the processing modules 619, 669 and their operating systems being involved. The transferred data from the copy in D'1 671 can then rewritten into non-failing ones of the drives D2-DN 622-629. For example, drive DN 629 could be a spare drive that is used replace the failed drive D1 621. The data from the copy in D'1 671 is not decoded by the RAID module 663, or re-encoded by the RAID module 613, but can be transferred be a "remote" direct memory access (RDMA) operation through use of the buffers 665 and 615 that is independent of the RAID modules 613 and 663 of the two RAID arrays 601 and 651, where the DMA process is remote as the direct memory access is between the two RAID arrays over a computing fabric 650 or network. Alternate embodiments can use a simple, non RDMA transfer. Although a RDMA allows data to be moved with limited CPU resources wasted, embodiments running systems that do not employ RDMA fabric can also use the techniques described here.

The transfer process is illustrated schematically on FIG. 6. In response to the drive D1 621 failing, which can be determined by the drive itself or the control section 610, the metadata 641 on the drive D1 621 or the metadata 642-649 on the other drives is checked to see if the drive D1 621 is mirrored on another array. In this example, the metadata indicates the data of drive D1 621 is mirrored on drive D'1 671 of RAID array 651. A request for data from RAID array 601 is sent out over the computing fabric 650 or other network by way of the switching elements 650*a*, 650*b* to the RAID array 651. This then begins a DMA transfer from drive D'1 671 through the drive interface 667 to the buffer 665, and from the buffer 663 through the network interface 661 and onto the computing fabric or other network. This process does not involve the RAID module 663 and the data as placed on the network is still the RAID encoded data as stored on the drive D'1 671. In other embodiments, the mirror copy of the content on the failed drive D1 621 may distributed across several of the drives of RAID array 651, in which case the corresponding mirror data would be transferred from these drives.

The RAID array 601, being a RAID array, can also rebuild the drive D1 621 within itself, using the RAID module 613 and RAID encoded data from the other drives D2-DN 622-629. In addition to the RAID array 601 rebuilding data stored on a failed drive completely through transfer of the mirror copy from another RAID array, or rebuilding the content of the failed drive completely on its own, the rebuild can interleave these two processes, where the amount of interleaving can be variable. For example, if the RAID arrays are connected over a high-performance computing fabric and have sufficient buffer capacities, all or the bulk of the rebuilding can be based on the DMA transfer of the mirror copy. If, instead, either the network speed or buffer size is limiting, a larger proportion of the rebuild can be done by the RAID module on the RAID array undergoing the rebuild. The work load on the RAID arrays can also influence the ratio: for example, if the rebuilding RAID array is concurrently receiving a large number of read or write requests, these requests will place a load on the RAID module, which the RAID array can mitigate by shifting a larger proportion of the rebuild to the RDMA process in order to maintain read/write performance. Conversely, if the mirroring RAID array is under a high load, more of the rebuild can shifted back to the rebuilding array.

RAID array 601 can also use knowledge of the mirroring RAID array 651 to reduce the load from host interactions to allow it to perform more of the rebuilt itself. For example, when the RAID array 601 receives a request for data from a host, it can refer this request to mirroring RAID array 651 to fulfill the request and supply the data. This will free up the rebuilding array 601 to perform a larger proportion of the rebuild itself by reading out the RAID encoded redundancy data from the good drives D1-DN 622-629 and using the RAID module 613 to reconstruct the content of the failed drive.

In embodiments described above, the control section 610 in the enclosure for the RAID array 601 has access to the existence of other RAID arrays such as 651 have a mirrored copy of the data. The information on the existence and location of the mirroring array or arrays can be stored in the RAID array 601 as part of the management data maintained by the control section 610, such as in a non-volatile memory the control section keeps such data, and/or in the metadata 641-649 of the array's drives D1-DN 621-629. In the event of a drive failure, the array goes into critical mode and a rebuild begins through the transfer of the mirror copy. In other embodiments, where the drives D1-DN 621-629 have a RAID module (such as RAID module 228 of FIG. 2), the RAID array control section 610 can offload RAID encoding to the drives D1-DN 621-629 to handle some, or even the bulk, of the parity generation amongst themselves with minimal or no help from the RAID module 613 of central control section 610. For any of the embodiments, the knowledge of an existing mirrored array and its current state could be stored in the metadata of the array itself. In the event of a drive failure, the array goes into critical mode and a rebuild begins.

Figure 12:
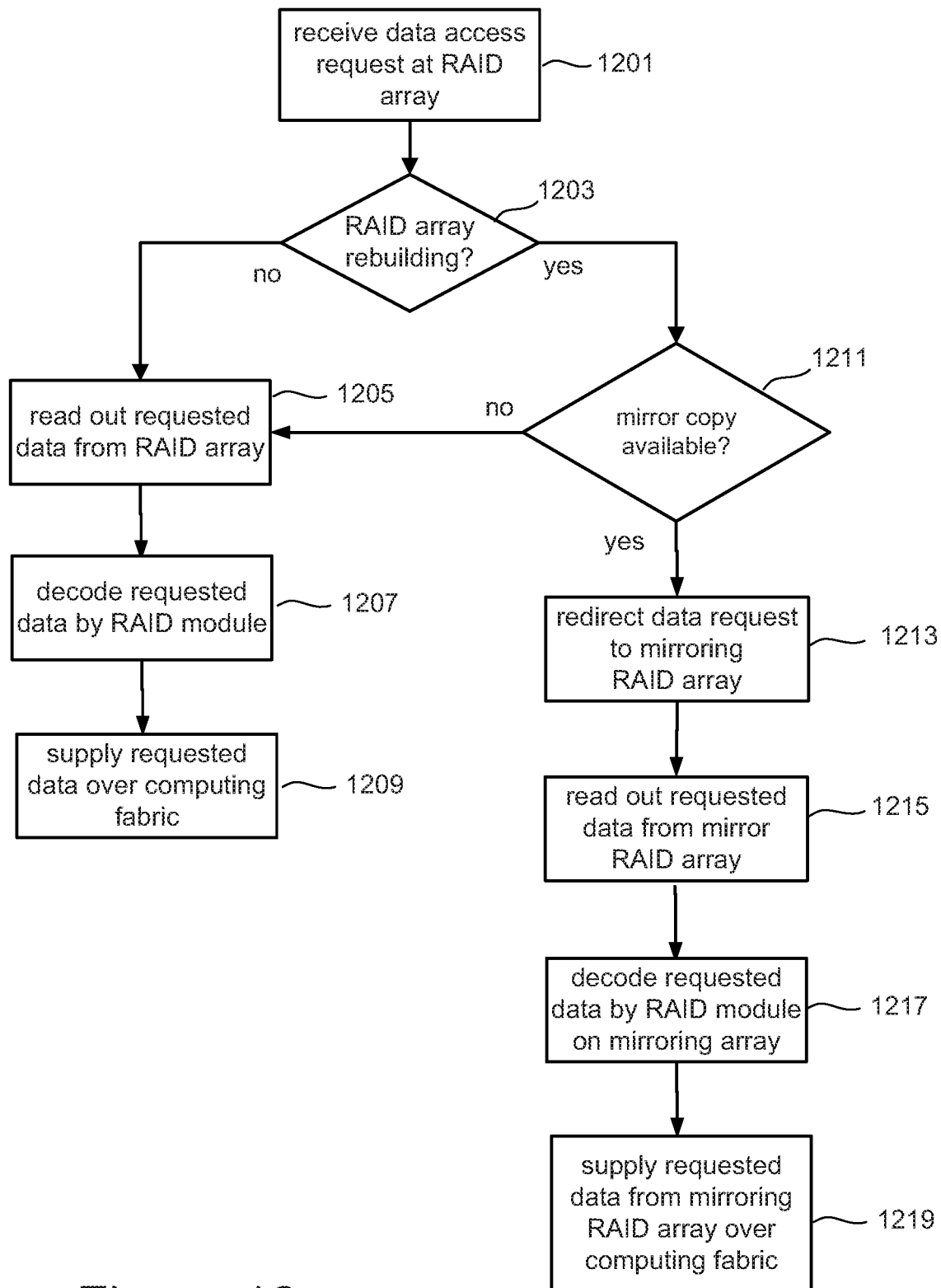
FIG. 12 is a flowchart describing one embodiment of a process for using a mirroring RAID array to fulfill data requests during a rebuild operation on a RAID array.

For any of the embodiments, in the event of a drive failure the RAID array, being aware of the existence of another mirror of the data, can choose to do one of three things: (1) perform the rebuild in the normal manner within the RAID array itself; (2) rebuild through a remote direct memory access (RDMA) operation from a mirroring array; or (3) interleave these two rebuilding processes. This can be illustrated by the flowchart of FIG. 7. During the rebuild process, if a mirror copy is available, the rebuilding RAID array can also have a mirroring RAID array handle some or all data requests, freeing up the rebuilding RAID array to more quickly rebuild, as is illustrated by the flowchart of FIG. 12.

Figure 7:
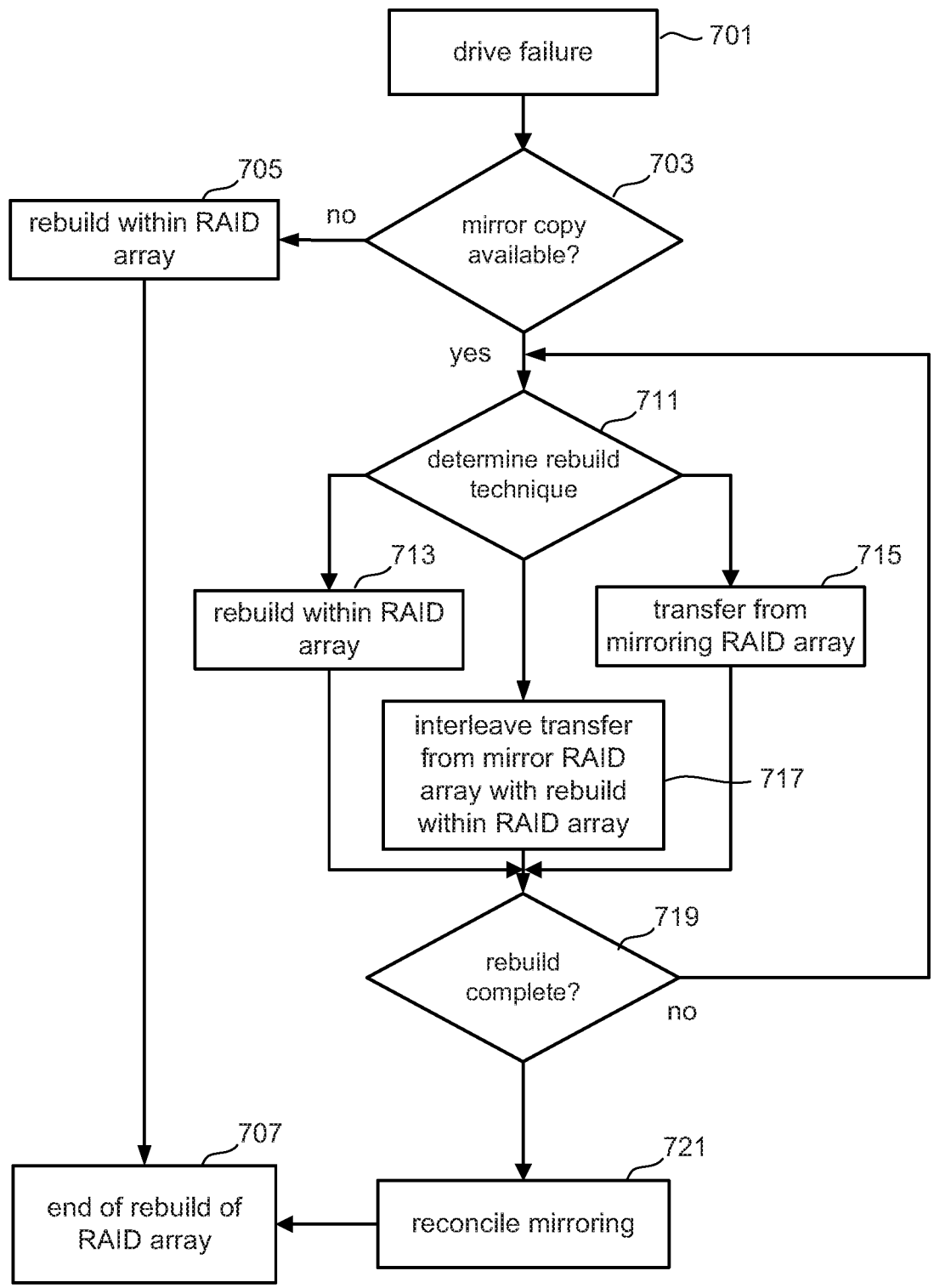
FIG. 7 is a flowchart describing one embodiment of a process for a rebuild operation on a RAID array, such as illustrated with respect to FIG. 6.

FIG. 7 is a flowchart describing one embodiment of a process for a rebuild operation on a RAID array, such as illustrated with respect to FIG. 6. At step 701, the control section 610 determines that a drive, drive D1 621 for example, has failed or is failing and that a rebuild process should be performed. In other embodiments, where the drives D1-DN 621-629 have RAID capabilities, this can be done at the drive-to-drive level. At step 703, the RAID array determines if a mirrored copy of the failed drive is available on another RAID array. This information can be stored as part of the metadata 641-649 on the drives D1-DN 621-629, in other memory maintained by the control section 610, or some combination of these. The information on mirror copies can include the location of the mirror RAID array and may also include information relevant to a peer to peer transfer process, such as buffering capacity and available transfer rates. If no mirror copy is available, the rebuild is performed as normal at step 705 on the RAID array 601 itself, as illustrated in more detail above with respect to FIG. 5. This is done by, for example, reading out the needed data and parities, performing any needed decoding and re-encoding, and rewriting the data back into one or more of the good drives D2-DN 622-629. As no mirror copy is available, the rebuilding RAID array must also handle any data requests. Once the rebuild is complete, the rebuild process ends at step 707.

If a mirror copy of the failed or failing drive is available, multiple options are available for the rebuild, and step 711 determines which of these to use. The choices include performing the rebuild with the RAID array 601 (step 713), performing it entirely through a remote direct memory access (RDMA) or other transfer of the copy from the mirroring RAID array 651 (step 715), or a combination of these (step 717). Depending on the embodiment, the choice can be based the available transfer speed of the computing fabric or other network connection between the RAID arrays; the buffering capabilities of the both the transferring and receiving RAID arrays; and the load, in terms of read and write requests, that the RAID arrays are under. For example, if the RAID arrays 601 and 651 are connected over a high bandwidth computing fabric and have large capacity buffers 615 and 665, this will favor performing more of the rebuild (or all) through a transfer. The choice at step 711 can also be based on the extent to which data requests from the rebuilding drive are fulfilled by the mirroring RAID array 651, as described with respect to FIG. 12.

At step 713, the rebuild is performed by the RAID array 601 itself, as illustrated in more detail above with respect to FIG. 5. As described further with respect to FIG. 12, during the rebuild process, the rebuilding RAID array can have some or all data requests handled by the mirroring array 651. This can allow the RAID array 601 to rebuild itself more rapidly by allowing the RAID module 613 on the control section 610 and any RAID modules on the drives themselves (such as RAID module 228 on the SSD of FIG. 2) to focus on the rebuild process.

Step 715 corresponds to the case where the failed drive is rebuilt by transferring the mirrored copy in a remote direct memory access (RDMA) or other transfer from the mirroring RAID array 651. Step 715 is described in more detail with respect to FIG. 8.

Figure 8:
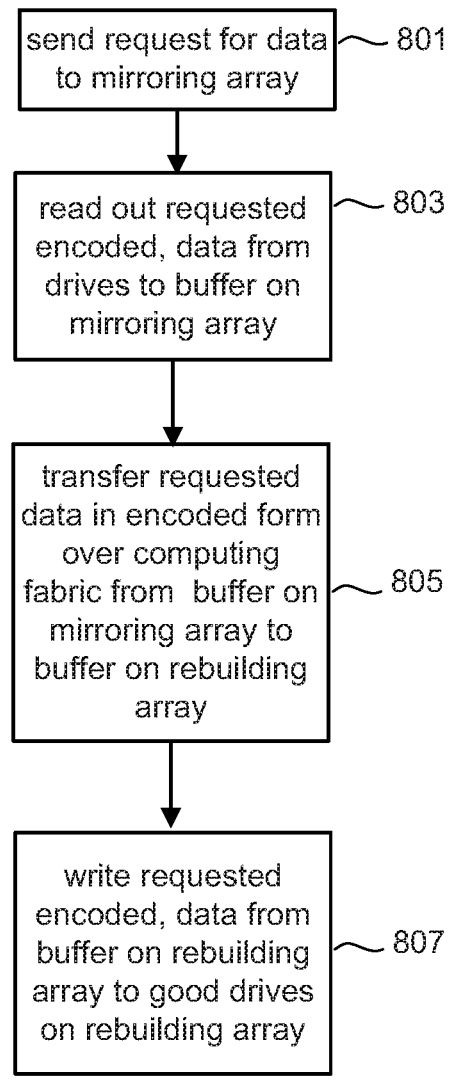
FIGS. 8 and 9 are detail for steps of FIG. 7.

FIG. 8 is a flowchart describing one embodiment of a process for step 715 of rebuilding the mirrored copy in a remote direct memory access (RDMA) or other transfer from the mirroring RAID array 651. At step 801, the rebuilding array sends a request to the mirroring array for the needed data to be transferred in an RDMA or other transfer process. The mirror array can be identified by metadata on the RAID array. The mirrored RAID encoded data is read out of one or more of the drives D'1-D'N' 671-679 into buffer 665 at step 803. Depending on the embodiment, the mirrored data may be stored in a single drive, such as D'1 671, or distributed across several drives. The encoded, mirror copy of the data is then transferred from the buffer 665 across over the computing fabric 650 and into the buffer 615 on the rebuilding RAID array 601 at step 805. Still in RAID encoded form, the data can then be written from the buffer 615 into the drives on rebuilding RAID array 601, for example into a spare drive such as DN 629, at step 807. During this process, as the RAID module 613 is not being used for the rebuild, it can handle some or all data requests to the RAID array 601, although some requests can also be fulfilled by the mirroring RAID array 651 in some embodiments.

If step 717 is selected at 711, the RAID array 601 can request some variable level of interleaving between the rebuilding RAID array 601 rebuilding the content on the failed drive itself and requesting the mirror copies from the RAID array 651 that is in an optimal state. Step 717 is described in more detail with respect to FIG. 9.

Figure 9:
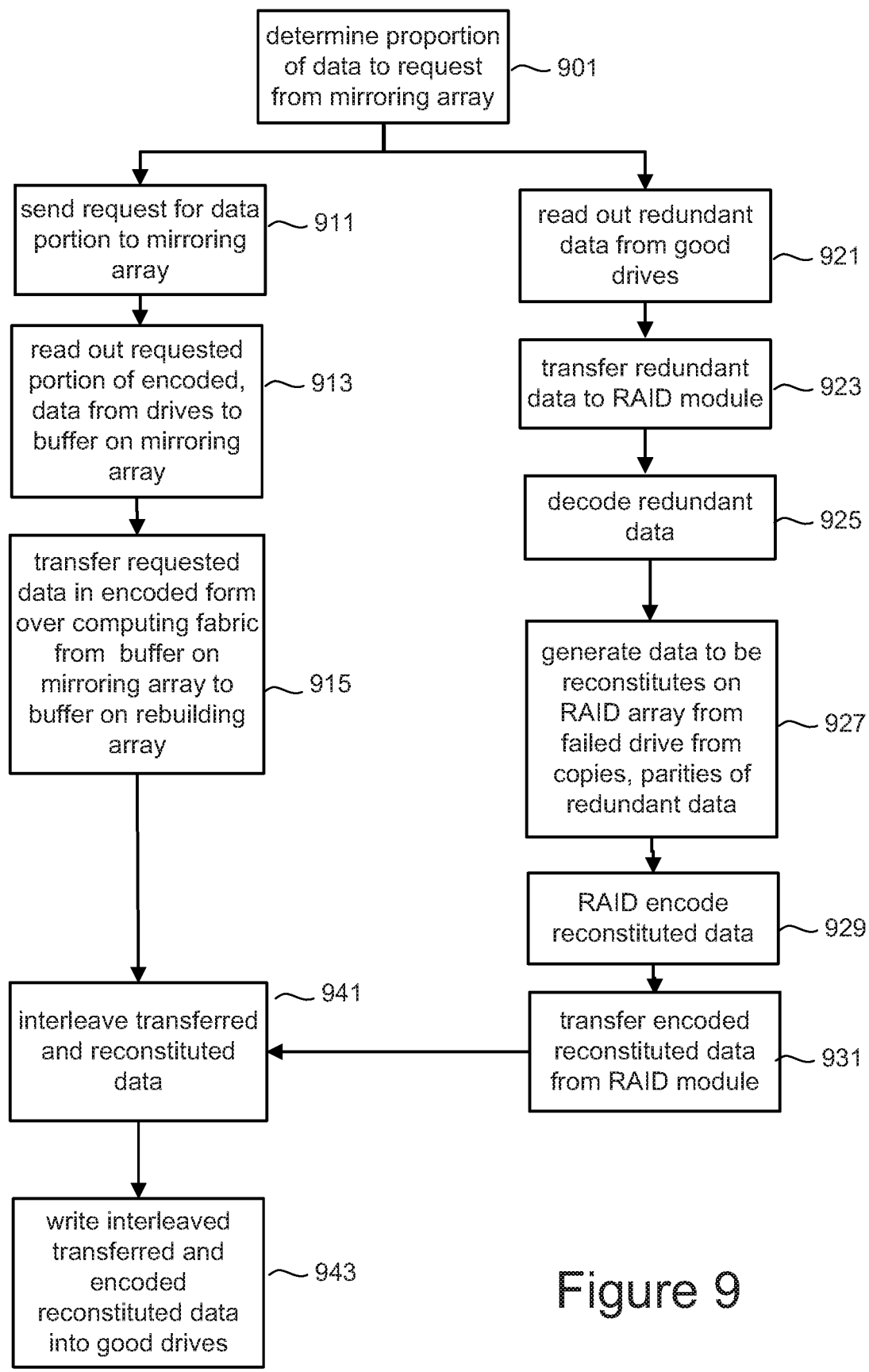

FIG. 9 is a flowchart describing one embodiment of a process for step 717 of rebuilding the failed drive's content by a combination of rebuilding on the RAID array 601 itself and of a transfer of a mirrored copy in a remote direct memory access (RDMA) or other transfer from the mirroring RAID array 651. At step 901, the proportions of the data content from the failed array to be rebuild from the two processes is determined. The ratio of interleaving data from internal RAID array rebuild performed on RAID array 601 and retrieval of data from a secondary copy on RAID array 651 can be controlled automatically based on any number of predetermined rules, such as current storage workload or network workload or set manually by the user. For example, the relative ratio between these can be based on percentages of input/output workload between the two RAID arrays, or the two RAID arrays can split up the work by starting at opposite ends of the RAID array, or by any other partitioning of the work that is convenient. This lessens the traffic on the rebuilding RAID array 601 and can be managed to allow the rebuilding RAID array 601 to finish more quickly, with the ratio of which array is supplying what adjusted based on current user traffic experienced at the arrays.

For example, in one embodiment where the rebuilding is evenly split between the two techniques the RAID array 601 could have every even numbered minor stripe (the portion of a stripe on an individual drive) on the rebuilding drive be built locally by RAID module 613, while requesting the odd numbered minor stripes be supplied by the optimal RAID array 651. This is illustrated schematically in FIG. 10.

Figure 10:
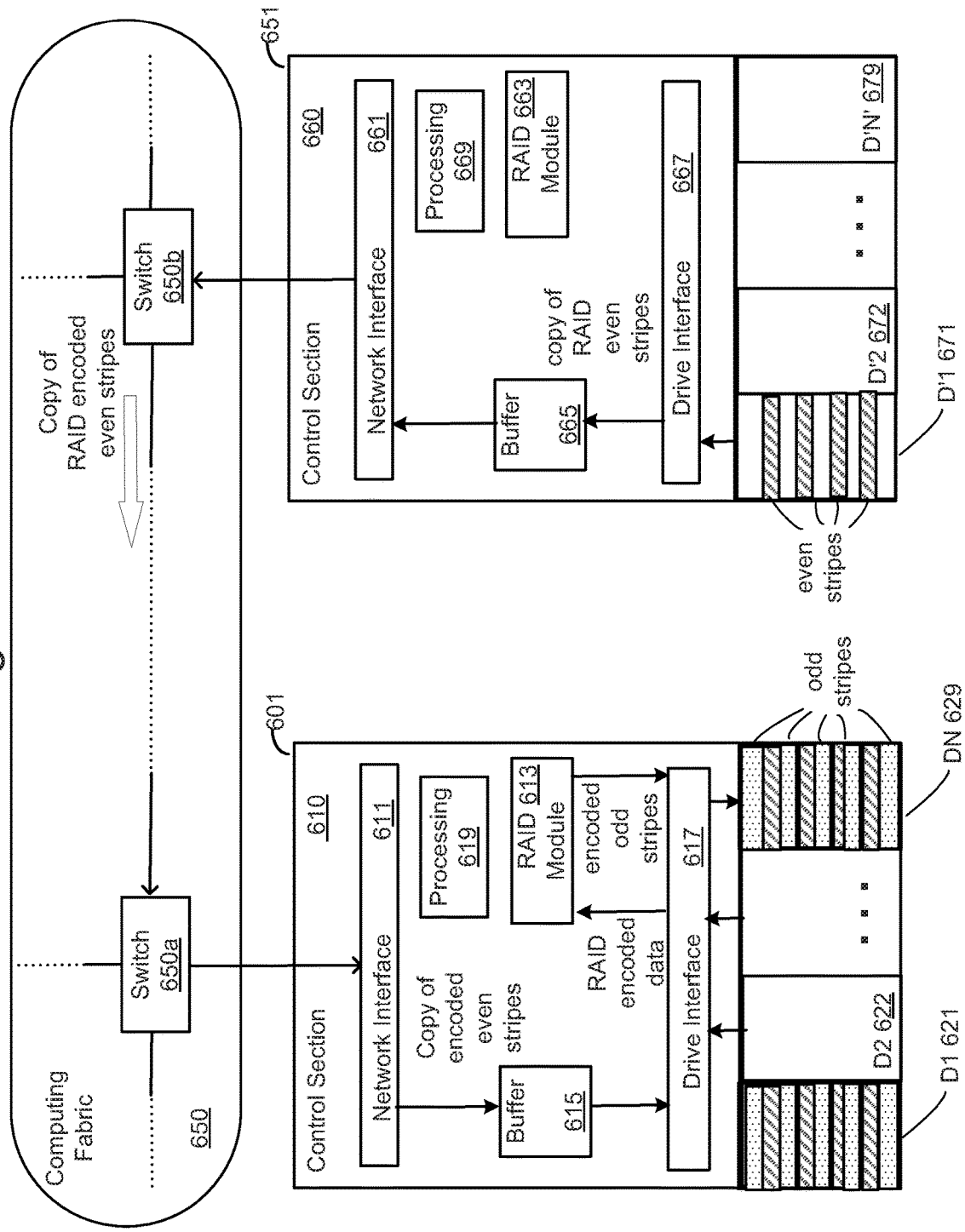
FIG. 10 illustrates a rebuild where even stripes are transferred from a mirroring RAID array and odd stripes on generated on the rebuilding RAID array.

FIG. 10 repeats the elements of FIG. 6, but now to illustrate a rebuild that alternates stripes between those rebuilt on the rebuilding array 601 and those transferred from the mirroring array 651. In the example of FIG. 10, drive D1 621 has failed and is to be rebuilt and stored on a spare drive DN 629. The data is striped on drive D1 621 alternates between even (stippled patterns in FIG. 10) stripes and odd (hatched patterns in FIG. 10) stripes. The odd stripes will be reconstituted on the RAID array 601 using RAID module 613 by reading out the RAID encoded redundant data for drive D1 621 from the other drives of the RAID array 601. The RAID module then reconstructs the odd stripes of drive D1 621 from encoded redundant data. The even strips are requested from the mirroring array 651. For example, in an embodiment where drive D'1 671 is a mirror copy of D1 621, the even stripes of D'1 671 are read out into the buffer 665, and then transferred over the computing fabric 650 to the buffer 615. The even stripes in buffer 615 and the odd stripes from the RAID module 613 can then be interleaved and written into the spare drive DN 629 to complete the rebuild. Depending on the embodiment, the interleaving can have the optimal RAID array 651 provide rebuilt stripes utilizing its RAID module 663 resources and the drive capabilities of the entire RAID array 651, or it can also be as simple as copying fresh data directly to rebuilding RAID array 601 from a single drive, such as D'1 671 in the assisting RAID array 651.

Returning to FIG. 9, after determining the proportion of the rebuild data to request from the mirroring RAID array 651 at step 901, the transfer process begins at step 911 and the on-array rebuild begins at step 921. At step 911, the rebuilding RAID array 601 sends the request for the encoded mirror copies to the mirroring array 651. In the example illustrated in FIG. 10, this would be a request for the even data stripes. The mirroring RAID array 651 reads out the requested RAID encoded data from its drives (drive D'1 671 in the example of FIG. 10) into buffer 665 at step 915. The requested RAID encoded data is then transferred over the computing fabric 650 to buffer 615 at step 915.

The transfer of steps 911-915 can be done in an overlapping manner with the on-array rebuilt starting at step 921. At step 921, the redundant data for failed drive D1 621 is read out from the other drives of RAID array 601 and, at step 923, transferred to the RAID module 613. Similarly to steps 505-513 of FIG. 5, the redundant data is transferred to the RAID module at step 923 and decoded at step 925. The data to be reconstituted on the RAID array 601 is then generated at step 927, and then RAID encoded at 929. The RAID encoded reconstituted data is then transferred out of the RAID module at step 929. Where steps 921-931 differ from steps 503-513 of FIG. 5 is that in FIG. 9 only a portion of the data needed for the rebuild is being generated as the remainder of the needed data is being transferred from the mirroring array 651 in steps 911-915.

At step 941, the data transferred from the mirroring array 651 and the data generated on-array by the RAID module 613 are interleaved at step 941. For the example of FIG. 10, these would be the even and odd stripes, respectively. The interleaved transferred and reconstituted data is then written into the good drives of the RAID array 501 at step 943 to complete the rebuild.

The rebuilding process can be monitored at step 719 to determine if the rebuild is complete. While the rebuild continues, the flow can loop back to step 711 to update how the rebuild is performed, either switching between steps 713, 715 and 717, or, in the case of 717, varying the ratio of how much rebuilding the RAID array 601 does on its own and how much it relies on transfers of data in the optimal state from the mirroring RAID array 651. Once the RAID array 601 is rebuilt, step 721 performs any updating to reconcile the mirroring between RAID arrays 601 and 651. For example, as described further with respect to FIG. 12, if data requests are transferred from RAID array 601 to be fulfilled RAID array 651 during the rebuild process, the mirroring between RAID array 651 on rebuilt RAID array 601 may not be current. The mirroring is reconciled at step 721, after which the rebuild process ends at step 707.

As mentioned above, during rebuilding of a RAID array 601, the existence of a mirror copy of the RAID encoded data in another RAID array 651 can also assist in the rebuild process by allowing the mirroring RAID array 651 to fulfill data requests to rebuilding RAID array 601. Depending on the embodiment, this transference of data requests can be used together with, or independently of, the transference of RAID encoded data from the mirroring RAID array for use in the rebuilding. This is illustrated schematically in FIG. 11.

Figure 11:
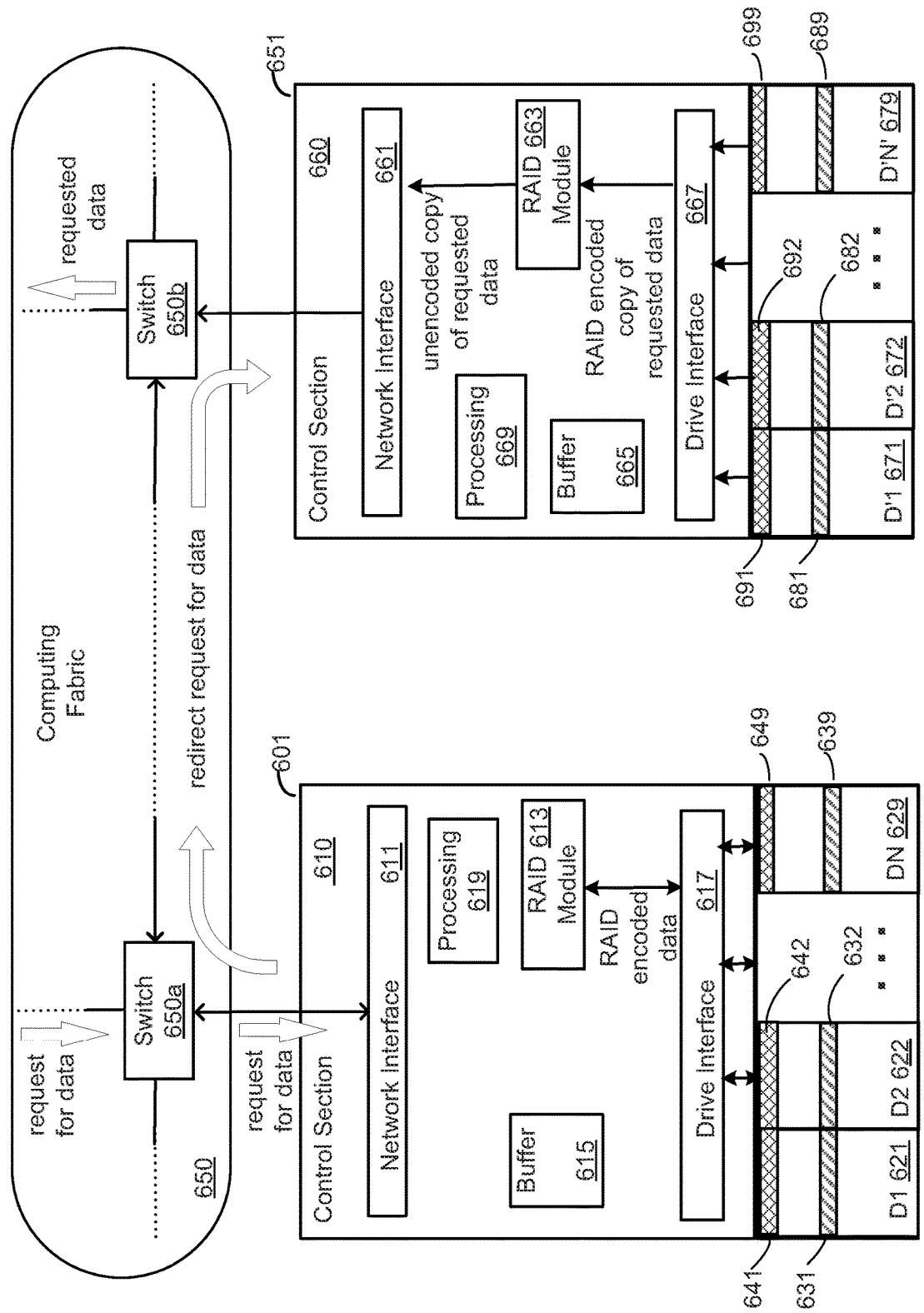
FIG. 11 illustrates the redirecting of a data request from a rebuilding RAID array to a mirroring RAID array.

FIG. 11 repeats the elements of FIG. 6, but now illustrates the situation when the RAID array 601 is performing the rebuild operation itself and redirects requests for data. On RAID array 601, a rebuild operation for failed drive D1 621 is underway, such as that described with respect to FIG. 5. Data is being read out from the good drives D2-DN 622-629 to the RAID module 613, where the content of the failed drive is reconstituted and written back into one or more of the good drives D2-DN 622-629. During this rebuild process, a request for data is received over the computing fabric 650 from a host. As fulfilling the data request would require the use of the RAID module 613, this would interfere with the rebuild operation.

Rather than fulfill the data request, part or all of the request is redirected to the mirroring RAID array 651. The mirroring array 651 can fulfill the request by reading out the copy of the requested data from drives D'1-D'N' 671-679 and decoding in the RAID module 663. The unencoded copy of the requested data can then be transferred out on to the computing fabric 650 to fulfill the host request.

FIG. 12 is a flowchart describing one embodiment of a process for using a mirroring RAID array to fulfill data requests during a rebuild operation on a RAID array, such as illustrated in FIG. 11. The process of FIG. 12 can be combined with steps 711-719 of FIG. 7 to complete the rebuild more quickly. The flow of FIG. 12 begins at step 1201 with the RAID array 601 receiving a data request over the computing fabric 550 or other network over the network interface 611. At step 1203, it is determined whether the RAID array is undergoing rebuild and, if not, the RAID array 601 fulfills the request itself. At step 1205 the RAID array 601 reads the requested data off of the drives D1-DN 621-629. Step 1207 performs any needed RAID decoding. The requested data is then supplied to the requesting host over the computing fabric 650 or other network at step 1209.

If the RAID array is rebuilding, then at step 1211 the RAID array determines if a mirrored copy of the failed drive is available on another RAID array: if not, the flow goes to step 1205 for the standard rebuild; if so, part or all of the data request can be redirected. In embodiments that combine the flows of FIG. 7 and FIG. 12 in the rebuilding process, step 1211 can be the same as step 703. The rebuilding RAID can then inform other RAID array copies that it is in a rebuild state.

At step 1213, the rebuilding RAID array 601 can request the other RAID array 651 to handle some or all of the data requests that it receives during the rebuild. This allows the rebuilding RAID array 601 to more quickly rebuild. Any user data to be written can be watermarked and updated in the rebuilding RAID array 601 at the end of rebuild at step 721 of FIG. 7; or, in other embodiments, the rebuilding RAID array 601 can request that the second RAID array 651 handle all the read requests, but write requests are sent to both RAID arrays. This second option does not remove all of the interference during the rebuild, but lessens it. Algorithms can be put in place to make these decisions based on the level of reads versus writes during some given time period. To fulfill the redirected data request, the mirroring RAID array 651 reads out the mirror copy of the requested data at step 1215 and performs any needed RAID decoding at step 1217.

The requested data is then supplied from the mirror RAID array 651 over the network at step 1219. Depending on the embodiment, the data can be RAID decoded and supplied from the mirror RAID array 651; or supplied from the mirroring RAID array 651 back to rebuilding RAID array 601 and then on to the requesting host.

In some embodiments a non-volatile memory system includes a first RAID (Redundant Array of Independent Disks) array. The RAID array includes a plurality of non-volatile memory drives and one or more control circuits. The one or more control circuits include: a network interface; a RAID module configured to encode data received over the network interface and to store the encoded data distributed across the memory drives in a redundant manner; and a buffer. In response to a failure of a first of the drives, the one or more control circuits are configured to perform a rebuild operation of data stored on the first drive. The rebuild operation includes requesting of at least a portion of an encoded copy of data stored on a first drive from a second RAID array, receiving the portion of the encoded copy of the data from the second RAID array in the buffer in a transfer over the network interface, and writing independently of the RAID module the portion of the encoded copy of the data from the buffer into one or more of the drives.

Further embodiments include system of a system of a computing fabric and a plurality of RAID (Redundant Array of Independent Disks) arrays connected over the computing fabric. Each of the RAID arrays connected over the computing fabric include a plurality of non-volatile data storage drives and one or more control circuits. The one or more control circuits include a RAID module configured to encode user data and to store the encoded user data distributed across the drives. In response to one of the RAID arrays determining that a first of the its drives is failing, the system is configured to perform a rebuild of the RAID array with the failing drive, the rebuild including determining whether another of the RAID arrays is a mirror RAID array that stores a mirror copy of data stored on the rebuilding RAID array. In response to a data request to the rebuilding array received over the computing fabric from a host to the rebuilding RAID array during the rebuild, the one or more control circuits of the rebuilding RAID array are configured to request the mirror RAID array fulfill the data request by supplying at least a portion of the requested data over the computing fabric to the host.

Other embodiments include a RAID (Redundant Array of Independent Disks) array. The RAID array includes a plurality of data storage drives and means for encoding user data and storing the encoded user data distributed across the data storage drives in a redundant manner. The RAID array also includes means for rebuilding data content of the RAID array in response to one of data storage drives failing. The means for rebuilding is configured to access another RAID array holding a mirror copy of the encoded user data stored in the failing data storage drive to accelerate the rebuilding of the data content of the RAID array.

In example implementations, the data storage drives can include solid-state drives (SSDs) as illustrated with respect to FIG. 2, hard disk drives (HDDs) as illustrated with respect to FIG. 3, or other types of data storage drives. Embodiments of he means for encoding user data and storing the encoded user data distributed across the data storage drives in a redundant manner can include RAID modules on the control section of the RAID array, such as RAID module 113 of FIG. 1, RAID modules on the drives themselves, such as RAID module 228 of FIG. 2, or combinations of these and other elements on the RAID arrays. The means storing the encoded data can also include circuitry on the non-volatile memory circuits, such as on non-volatile memories 202 of FIG. 2, or the read/write head 311 of FIG. 3.

Depending on the embodiment, the means for rebuilding can accelerate the rebuilding process through transferring of a mirror copy from another RAID array of the data content of the failing drive; the redirecting of data requests to another RAID array having a mirror copy of the data content of the failing drive; or a combination of these. The means for rebuilding can include RAID modules on the control section of the RAID array, such as RAID module 113 of FIG. 1, RAID modules on the drives themselves, such as RAID module 228 of FIG. 2, or combinations of these and other elements on the RAID arrays. The means for rebuilding can also include the buffer memory 115 of FIG. 1, as well as other memory and control elements on the RAID array control section 110 and on the drives of the RAID array.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of zero or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:
1. A non-volatile data storage system, comprising:
a first Redundant Array of Independent Disks (RAID) array, comprising:
a plurality of non-volatile data storage drives; and
one or more control circuits, including:
a network interface;
a RAID module configured to encode data received over the network interface and to store the encoded data distributed across the plurality of non-volatile data storage drives in a redundant manner; and
a buffer,
wherein, in response to a failure of a first non-volatile data storage drive of the plurality of non-volatile data storage drives, the one or more control circuits are configured to perform a rebuild operation of data stored on the first non-volatile data storage drive, the rebuild operation including:
requesting at least a portion of an encoded copy of data, stored on the first non-volatile data storage drive, from a second RAID array, the second RAID array storing at least a portion of data stored in the first RAID array,
receiving the portion of the encoded copy of the data from the second RAID array in the buffer in a transfer over the network interface, and writing, independent of the RAID module, the portion of the encoded copy of the data from the buffer into one or more of the plurality of non-volatile data storage drives in the first RAID array.

2. The system of claim 1, wherein the one or more control circuits are further configured to store information specifying the second RAID array as metadata stored on the plurality of non-volatile data storage drives.

3. The system of claim 1, wherein the one or more control circuits are further configured to rebuild at least a portion of the data stored on the first non-volatile data storage drive from data stored on the other non-volatile data storage drives of the first RAID array using the RAID module.

4. The system of claim 3, wherein:
the one or more control circuits are further configured to perform the rebuild operation as a combination of the transfer from the second RAID array and a rebuild from data stored on the other non-volatile data storage drives of the first RAID array using the RAID module; and
a proportion of the rebuild operation performed as the transfer from the second RAID array is based on a capacity of the buffer.

5. The system of claim 3, wherein:
the RAID module is further configured to store the encoded data distributed across the plurality of non-volatile data storage drives in a redundant manner by striping the encoded data across multiple ones of the plurality of non-volatile data storage drives; and
the one or more control circuits are further configured to perform the rebuild operation as a combination of the transfer from the second RAID array and a rebuild from data stored on the other non-volatile data storage drives of the first RAID array using the RAID module.

6. The system of claim 5, wherein the one or more control circuits are further configured to perform the rebuild operation from stripes alternating between stripes transferred from the second RAID array and stripes reconstructed on the first RAID array.

7. The system of claim 3, wherein the first RAID array is configured to perform the rebuild operation as a combination of the transfer from the second RAID array and a rebuild from data stored on the other non-volatile data storage drives of the first RAID array using the RAID module.

8. The system of claim 7, wherein the proportion of the rebuild operation performed as the transfer from the second RAID array is based on a transfer rate of data over the network interface between the first RAID array and the second RAID array.

9. The system of claim 1, wherein in response to a data request from a host during the rebuild operation, the one or more control circuits are further configured to request the second RAID array to fulfill the data request by supplying at least a portion of the requested data.

10. The system of claim 1, wherein in response to a request from a host to write a data set during the rebuild operation, the one or more control circuits are further configured to write the data set into the plurality of non-volatile data storage drives.

11. The system of claim 1, wherein the RAID module is further configured to encode data by generating parities corresponding to the data.

12. A method, comprising:
in response to a first Redundant Array of Independent Disks (RAID) array determining that a first non-volatile data storage drive of a plurality of non-volatile data storage drives in the first RAID array is failing, performing a rebuild of the first RAID array, the rebuild including:
determining whether a second RAID array is a mirror RAID array that stores a mirror copy of data stored on the first RAID array; and
transferring at least a portion of an encoded copy of data stored on the first non-volatile data storage drive of the first RAID array, over a computing fabric, from the second RAID array, in a direct memory access (DMA) transfer independent of RAID modules controlling the second RAID array; and,
in response to a data request to the first RAID array received from a host during the rebuild, requesting the second RAID array fulfill the data request by supplying at least a portion of the requested data over the computing fabric to the host.

13. The method of claim 12, wherein rebuilding the first RAID array further includes:
rebuilding at least a portion of the data stored on the first non-volatile data storage drive thereof from data stored on the other non-volatile data storage drives of the first RAID array using a RAID module of the first RAID array;
performing the rebuild as a combination of the DMA transfer from the second RAID array and a rebuild from data stored on the other non-volatile data storage drives of the first RAID array using the RAID module of the first RAID array;
buffering in a buffer memory the portion of the encoded copy of data from non-volatile data storage drives of the second RAID array; and
basing a proportion of the rebuild performed as the DMA transfer on a capacity of the buffer memory.

14. The method of claim 12, wherein rebuilding the first RAID array further includes:
rebuilding at least a portion of the data stored on the first non-volatile data storage drive from data stored on the other non-volatile data storage drives of the first RAID array using a RAID module of the first RAID array;
performing the rebuild as a combination of the DMA transfer from the second RAID array and a rebuild from data stored on the other non-volatile data storage drives of the first RAID array using the RAID module of the first RAID array;
buffering, in a buffer memory, the portion of the encoded copy of data from non-volatile data storage drives of the second RAID array determined to have a mirror copy; and
basing a proportion of the rebuild performed as the DMA transfer on a transfer rate of data over a computing fabric between the first RAID array and the second RAID array.

15. The method of claim 12, further comprising:
storing encoded data distributed across non-volatile data storage drives of the first RAID array in a redundant manner by striping the encoded data across multiple non-volatile data storage drives of the first RAID array;
storing encoded data distributed across non-volatile storage drives of the second RAID array in a redundant manner by striping the encoded data across multiple non-volatile data storage drives of the second RAID array;
wherein rebuilding the first RAID array further includes:
rebuilding at least a portion of the data stored on the first non-volatile data storage drive from data stored on the other drives of the first RAID array using a RAID module of the first RAID array;

using a combination of the DMA transfer from non-volatile data storage drives of the second RAID array determined to have a mirror copy and a rebuild from data stored on the other non-volatile data storage drives of the first RAID array using the RAID module of the first RAID array; and alternating between stripes transferred by the DMA transfer and stripes reconstructed on the first RAID array.

16. The method of claim 12, further comprising:

in response to a request from a host to write a data set to the first RAID array during the rebuild, writing the data set into the non-volatile data storage drives of the first RAID array.

17. The method of claim 12, further comprising:

encoding data in the first RAID array by generating parities corresponding to the data.

18. The method of claim 12, further comprising:

storing information specifying other RAID arrays, including the second RAID array, that store copies of data stored on the first RAID array as metadata stored on the non-volatile data storage drives of the first RAID array.

19. A Redundant Array of Independent Disks (RAID) array, comprising:

a plurality of data storage drives;

means for encoding user data and storing the encoded user data distributed across the plurality of data storage drives in a redundant manner; and means for rebuilding data content of the RAID array in response to a failing data storage drive among the plurality of data storage drives, the means for rebuilding further including:

means for requesting at least a portion of an encoded copy of data, stored on the data storage drive of the plurality of data storage drives, from another RAID array, the another RAID array storing at least a portion of data stored in the RAID array;

means for receiving the portion of the encoded copy of the data from the another RAID array in a buffer of the RAID array in a transfer over a network interface of the RAID array; and means for writing, independent of a RAID module of the RAID array, the portion of the encoded copy of the data from the buffer into one or more of the plurality of data storage drives in the RAID array.

* * * * *